United States Patent
Zerfass et al.

(10) Patent No.: US 7,550,018 B2
(45) Date of Patent: *Jun. 23, 2009

(54) METHOD OF PRODUCING A SEALING ARRANGEMENT FOR A FUEL CELL STACK AND A SEALING ARRANGEMENT FOR A FUEL CELL STACK

(75) Inventors: Hans-Rainer Zerfass, Taunusstein (DE); Rudolf Henne, Böblingen (DE); Johannes Arnold, Pforzheim (DE)

(73) Assignee: ElringKlinger AG, Dettingen (DE)

( * ) Notice: Subject to any disclaimer, the term of this patent is extended or adjusted under 35 U.S.C. 154(b) by 275 days.

This patent is subject to a terminal disclaimer.

(21) Appl. No.: 11/516,962

(22) Filed: Sep. 7, 2006

(65) Prior Publication Data

US 2007/0065707 A1 Mar. 22, 2007

(30) Foreign Application Priority Data

Sep. 21, 2005 (DE) ................. 10 2005 045 053

(51) Int. Cl.
*H01M 4/82* (2006.01)
*H01M 2/08* (2006.01)
(52) U.S. Cl. .................... 29/623.2; 429/36
(58) Field of Classification Search ........... 29/623.2; 429/36; 427/115
See application file for complete search history.

(56) References Cited

U.S. PATENT DOCUMENTS

| 5,939,219 | A | 8/1999 | Jansing et al. ............ 429/32 |
| 2004/0060967 | A1 | 4/2004 | Yang et al. ............... 228/245 |
| 2004/0104544 | A1* | 6/2004 | Fan et al. ................ 277/650 |
| 2004/0209147 | A1 | 10/2004 | Finkenwirth et al. ...... 429/35 |

FOREIGN PATENT DOCUMENTS

| DE | 195 38 034 C1 | 10/1995 |
| DE | 198 05 142 A1 | 8/1999 |
| EP | 1 246 283 A2 | 10/2002 |
| EP | 1 261 052 A2 | 11/2002 |
| EP | 1 453 133 A1 | 9/2004 |
| EP | 1 492 190 A2 | 12/2004 |
| JP | 3-119087 | 5/1991 |

* cited by examiner

*Primary Examiner*—Patrick Ryan
*Assistant Examiner*—Thomas H. Paesons

(57) ABSTRACT

A method is provided for producing an electrically insulating sealing arrangement for a fuel cell stack which comprises a plurality of fuel cell units that succeed one another along a stack direction by means of which the housings of the fuel cell units are connectable to one another in such a way that an adequate electrically insulating effect and adequate mechanical rigidity are ensured even at the high operating temperature.

The method involves producing a ceramic metal layer and at least partially converting the metal of the ceramic metal layer into an electrically non conductive compound so as to produce a non conductive boundary layer.

74 Claims, 12 Drawing Sheets

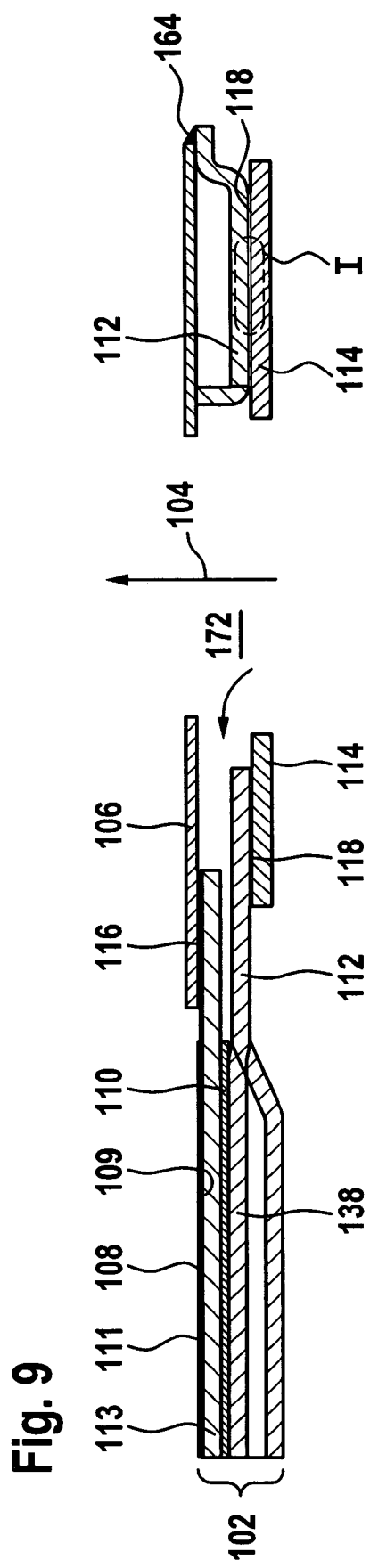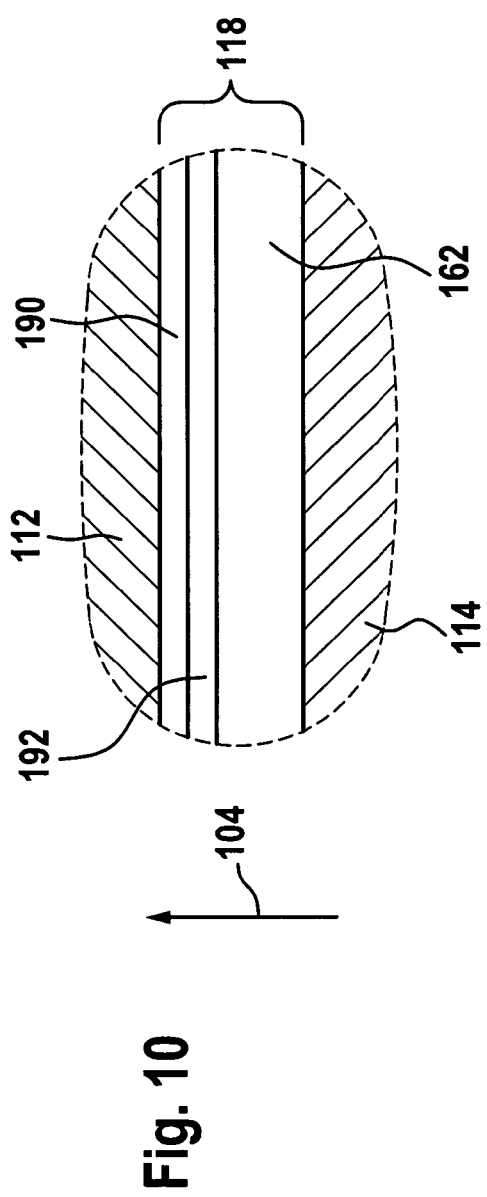

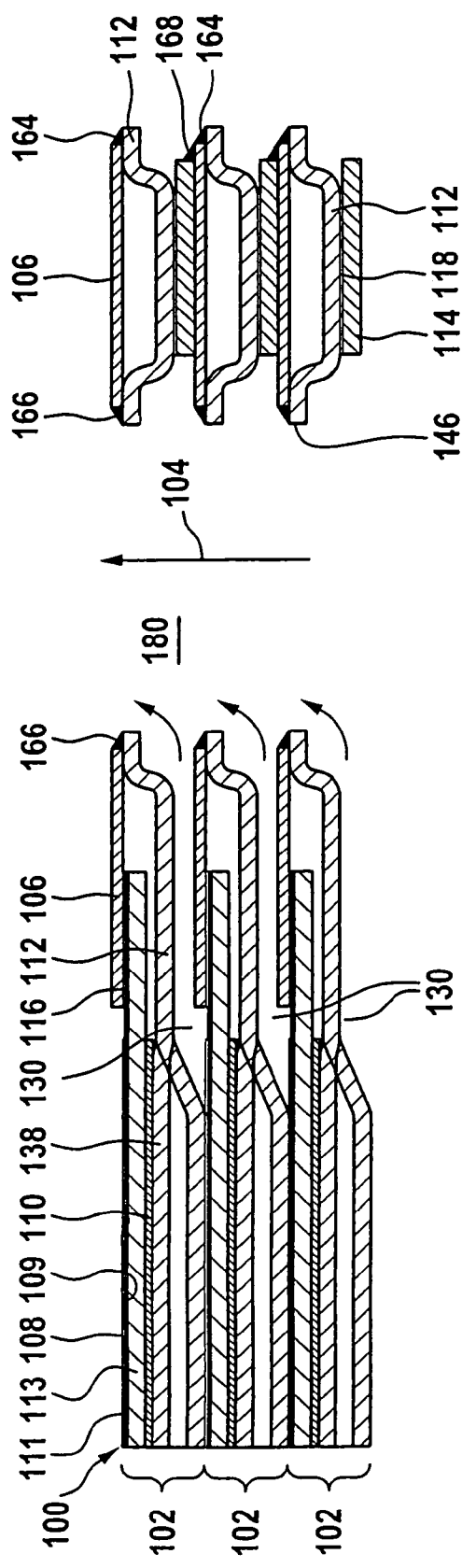
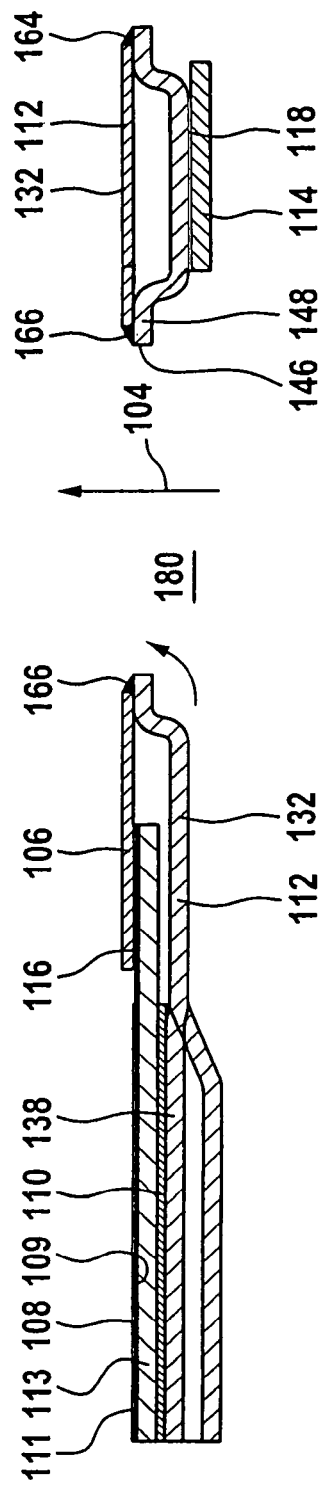
Fig. 12
Fig. 13

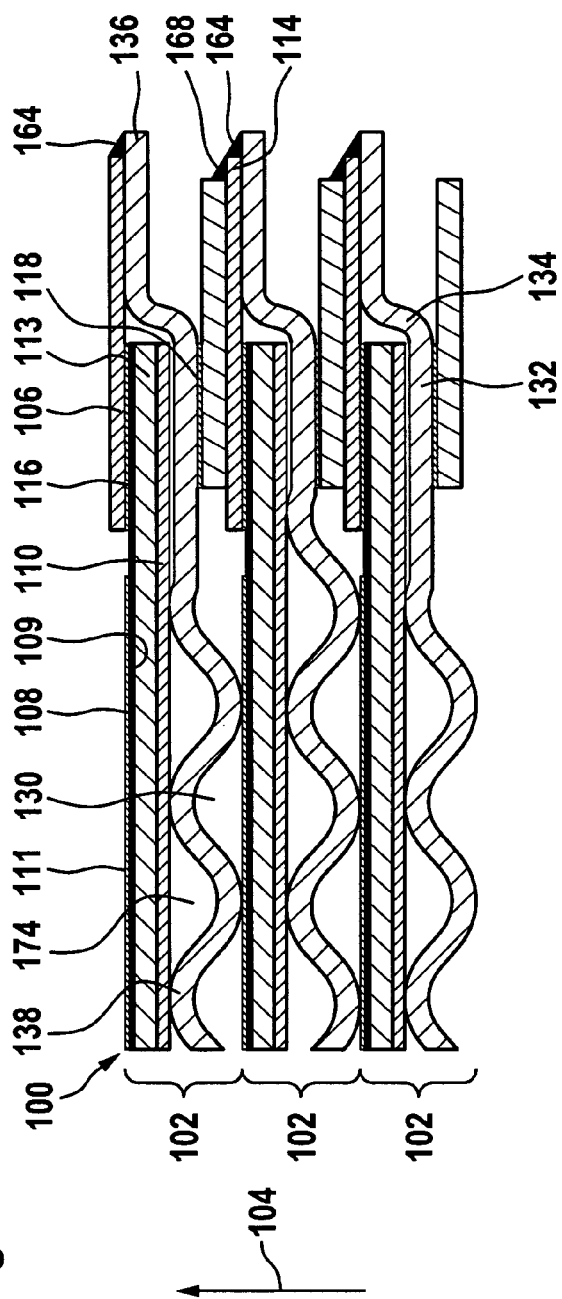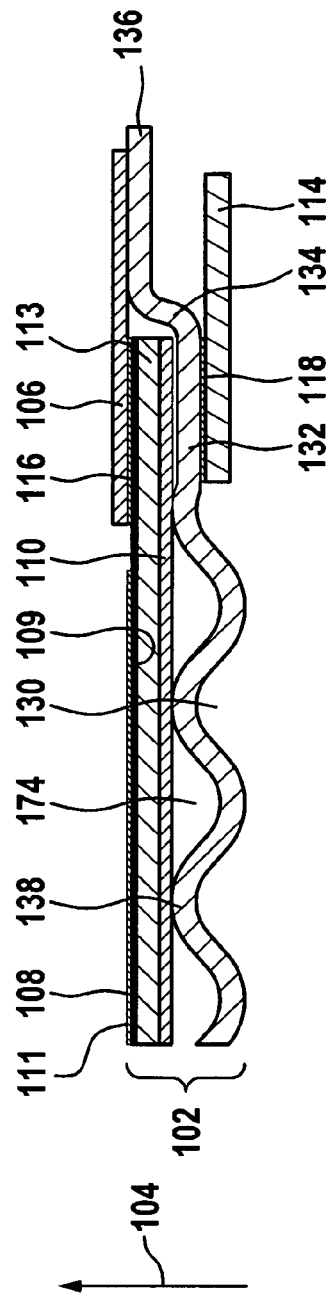

METHOD OF PRODUCING A SEALING ARRANGEMENT FOR A FUEL CELL STACK AND A SEALING ARRANGEMENT FOR A FUEL CELL STACK

RELATED APPLICATION

The present disclosure relates to the subject matter disclosed in German Patent Application No. 10 2005 045 053.9 of Sep. 21, 2005, the entire specification of which is incorporated herein by reference.

FIELD OF THE DISCLOSURE

The present invention relates to a method of producing an electrically insulating sealing arrangement for a fuel cell stack which comprises a plurality of fuel cell units that succeed one another along a stack direction.

BACKGROUND

For the purposes of setting the desired operating voltage, the necessary number of fuel cell units are arranged one upon the other in order to obtain a fuel cell pile (fuel cell stack). In order to prevent an electrical short-circuit, the housings of the successive fuel cell units in the fuel cell stack must be electrically insulated from one another. Moreover, it is necessary to separate the fuel gas channels of the fuel cell stack from the oxidizing agent chambers of the fuel cell units in gas-tight manner and to separate the oxidizing agent channels of the fuel cell stack from the fuel gas chambers of the fuel cell units in gas-tight manner.

In the case of known fuel cell stacks, sealing and insulating elements consisting of a glass solder or of ceramic sealing materials are used in order to produce the requisite electrically insulating effect and the requisite sealing effect.

In the case of most of the usually used sealing materials, the electrical resistance at the operating temperature of a high temperature fuel cell unit (in the range of approximately 750° C. to approximately 850° C.) is no longer high enough for achieving a satisfactory insulating effect. Furthermore, some of the usually used sealing materials only exhibit a low level of chemical stability and mechanical rigidity for the changes in temperature (between the operating and quiescent phases) that frequently occur in a high temperature fuel cell unit.

The sealing function and the electrically insulating function of the sealing arrangement can be separated from one another. Thus, the electrical insulation can be effected by a ceramic coating which is connected to an adjacent component of the fuel cell stack by means of a metallic solder in the course of a soldering process. Hereby, due to the gas-tight soldering process, the respective processes of sealing the fuel gas channels and the oxidizing agent channels of the fuel cell stack and the mechanical fixing of the fuel cell units to one another is effected at the same time.

The insulating ceramic coating can, however, contain pores and/or fissures and/or capillaries along the grain boundaries, especially if the ceramic coating is applied by a process of thermally spraying it onto a metal part that is to be insulated. Depending upon the capillary activity of the solder used, the solder can penetrate into the pores, fissures of capillaries present in the ceramic coating and cause a short-circuit.

SUMMARY OF THE INVENTION

The object of the present invention is to provide a method of producing an electrically insulating sealing arrangement for a fuel cell stack which comprises a plurality of fuel cell units that succeed one another along a stack direction by means of which the housings of the fuel cell units are connectable to one another in such a manner that an adequate electrically insulating effect and adequate mechanical rigidity are ensured even at a high operating temperature.

In accordance with the invention, this object is achieved by a method which comprises the following process steps:
producing a ceramic metal layer from a mixture of a ceramic material and a metal material and/or a metal precursor; and
at least partially converting the metal of the ceramic metal layer into an electrically non conductive metal compound so as to produce a non conductive boundary layer.

Surprisingly, it has been discovered that short-circuits due to the penetration of solder, in particular, into thermally sprayed layers of the sealing arrangement can, astoundingly, be prevented if the sealing arrangement comprises such a non conductive boundary layer which has been produced from a ceramic metal layer by converting the metallic component thereof, in situ, into a non conductive metal compound.

Here, in contrast to ceramic metal layers whose metallic component is not converted into a non conductive metal compound, there is no fear of a short-circuit occurring. This represents a significant advantage for the practical use of such a sealing arrangement.

The present invention is suitable, in particular, for the production of electrically insulating sealing arrangements for high temperature fuel cells of the SOFC (Solid Oxide Fuel Cell) type.

In a preferred embodiment of the invention, the ceramic metal layer from which the non conductive boundary layer is formed is in the form of a Cermet layer.

The ceramic metal layer is preferably produced by a thermal spraying process, in particular, by an atmospheric plasma spraying process, by a vacuum plasma spraying process or by a flame spraying process.

It is particularly expedient if the ceramic metal layer is produced by a high-speed vacuum plasma spraying process (High Velocity Vacuum Plasma Spraying: HV-VPS for short), since high-speed plasma-sprayed layers exhibit a particularly high density and a particularly low porosity.

The method used in a high-speed vacuum plasma spraying process (High Velocity Vacuum Plasma Spraying, HV-VPS for short) is described, for example, in the article by R. Henne, W. Mayr and A. Reusch: "Einfluss der Düsenkontur beim Hochgeschwindigkeits-Vakuumplasmaspritzen", in DVS reports DVS 152, Thermische Spritzkonferenz TS 93, Mar. 3-5, 1993, Aachen, Germany, pages 7 to 11, or in the article by R. Henne, V. Borck, D Siebold, W. Mayr, A. Reusch, M. Rahmane, G. Soucy, M. Boulos: "Converging-Diverging Nozzles for Improved Atmospheric Plasma Spraying" in VDI reports No. 1166, 1995, pages 247 to 266.

For the purposes of delimiting the ceramic metal layer in the lateral direction, templates or coating masks can be used during the thermal spraying process.

In the case of plasma spraying in particular, the following plasma gases or plasma gas combinations can be used:
argon;
nitrogen;
argon and helium;
argon and hydrogen;
argon, helium and hydrogen.

The ceramic metal layer can be formed, in particular, from a mixture of a powdered ceramic material and a powdered metal and/or a powdered metal precursor.

Hereby, a metal precursor is to be understood as being a metal compound which disintegrates at the working temperature of the thermal spraying process into its metallic component and its non-metallic component so that the metal component of the compound is present in the ceramic metal layer in a metallic form.

In accordance with the invention, a metal precursor or an elementary metal or a mixture consisting of a metal precursor and an elementary metal can be used for the production of the ceramic metal layer.

When using an elementary metal, the conversion of the metal into a metal compound that is not effective as a solder blocker can be prevented by employing a suitable environmental atmosphere (for example, an inert gas atmosphere such as e.g. argon) and/or by the addition of a reducing agent e.g. hydrogen.

It is particularly expedient if use is made of a metal material and/or a metal precursor which respectively comprises an active metal.

Hereby, an "active metal" is to be understood as being a boundary-surface-active metal such as is added in small quantities to active solders (metallic alloys) in order to lower the boundary surface energy between a ceramic material and the solder melt to such an extent that wetting of the ceramic material by the solder can take place.

Such "active metals" are, in particular, the metals of the group titanium, zirconium, hafnium, niobium, tantalum, silicon, cerium and vanadium.

The hydrides of these active metals are particularly suitable as a metal precursor.

A ceramic material which comprises aluminium oxide and/or titanium dioxide and/or zirconium dioxide and/or magnesium oxide can be used as a powdered ceramic material for the formation of the ceramic metal layer for example.

It is particularly expedient if a ceramic material which comprises yttrium-stabilized zirconium dioxide and/or an aluminium magnesium spinel is used for the production of the ceramic metal layer.

The average ratio, in parts by weight, of the ceramic material in the mixture to the metal material, to the metal precursor, or, (in the case of the common use of a metal material and a metal precursor) to the sum of the metal material and the metal precursor in the mixture consisting of a ceramic material and a metal material and/or a metal precursor that is used for the production of the ceramic metal layer amounts to from approximately 5:1 up to approximately 30:1 for example, preferably from approximately 15:1 up to approximately 25:1.

The ratio of the ceramic material in the mixture to the metal material, to the metal precursor, or, (in the case of the common use of a metal material and a metal precursor) to the sum of the metal material and the metal precursor can be kept substantially constant during the production of the ceramic metal layer or else however, it can be varied during the process of producing the ceramic metal layer in order to alter the mixture-ratio of ceramic material to metal material in the ceramic metal layer in the direction of the layer thickness, i.e. in a direction aligned perpendicularly to the major faces of the ceramic metal layer.

The variation in the mixture-ratio can, for example, be effected by the controlled, separate injection of the components, the ceramic material and the metal material, whereby the mixing process takes place in the jet spray.

If the non conductive boundary layer that has been produced is soldered to a component of the fuel cell stack by means of a metallic solder layer, then provision is preferably made for the ratio of the ceramic material in the mixture to the metal material, to the metal precursor, or, (in the case of the common compound of metal material and metal precursor) to the sum of the metal material and the metal precursor to be varied during the production of the ceramic metal layer in such a way that the part-by-weight of the metal material in the non conductive boundary layer increases with decreasing distance from the solder layer that is to be subsequently applied.

The ceramic metal layer is produced, advantageously, with an average layer thickness of approximately 10 µm to approximately 80 µm, preferably of approximately 20 µm to approximately 60 µm.

Furthermore, in order to improve the electrically insulating effect of the sealing arrangement still further, provision may be made for an insulating layer consisting of an electrically insulating ceramic material to be formed in addition to the non conductive boundary layer.

If the non conductive boundary layer is soldered to a component of the fuel cell stack by means of a metallic solder layer, then the insulating layer is preferably produced in such a way that it is arranged on the side of the non conductive boundary layer remote from the solder layer.

It has proven to be expedient if the insulating layer is produced by thermal spraying, in particular by atmospheric plasma spraying, by vacuum plasma spraying or by flame spraying.

It is particularly expedient if the insulating layer is produced by a high-velocity vacuum plasma spraying process, since a high-velocity plasma-sprayed layer exhibits a particularly high density and low porosity.

In principle, the insulating layer can be formed from any ceramic material which exhibits a sufficiently high specific electrical resistance at the operating temperature of the fuel cell stack.

In particular, for the purposes of producing the insulating layer, use can be made of a ceramic material which comprises aluminium oxide and/or titanium dioxide and/or zirconium dioxide and/or magnesium oxide.

Preferably for the production of the insulating layer, use is made of a ceramic material which comprises an aluminium magnesium spinel.

The insulating layer is advantageously produced with an average layer thickness of approximately 50 µm to approximately 200 µm, preferably of approximately 100 µm to approximately 140 µm.

In order to establish a connection between the sealing arrangement and adjacent components, in particular, metallic components of the fuel cell stack, provision may be made for a metallic solder layer to be produced in addition to the ceramic metal layer.

In particular, provision may be made for this solder layer to be at least partly produced by a process of thermally spraying solder material.

The solder material could also be applied partly by a process of thermal spraying and partly by means of another method, for example, by means of a silk-screen printing process.

In particular, provision may be made for a first solder component (copper oxide and titanium hydride for example) to be applied by a process of thermal spraying and subsequently, for a second solder component (a silver paste for example) to be applied by means of a silk-screen printing process.

In this case, it is only there where the two solder components are applied that the solder components will combine into an eutectic by means of which a soldered connection to an adjacent component of the fuel cell stack is producible.

In particular, a solder comprising at least one reactive component (i.e. a so-called reactive solder) can be used as the solder material for the solder layer, this permitting direct soldering of a ceramic-containing layer to metallic components of the fuel cell stack.

Also suitable for the purpose are so-called active solders which contain active elements, such as titanium, zirconium, hafnium, niobium, tantalum, silicon, cerium or vanadium for example.

Such a solder is obtainable under the designation Copper ABA from the company Wesgo Metals, 610 Quarry Road, San Carlos, Calif. 94070, USA or from the company Wesgo Metals, 2425 Whipple Road, Hayward, Calif. 94544, USA.

This active solder has the following composition: 2 percentage weight Al; 92.7 percentage weight Cu; 3 percentage weight Si; 2.3 percentage weight Ti.

A silver based solder could also be used for the production of the solder layer for example.

Such a silver based solder can be used with or without the addition of elementary copper.

If the silver based solder without an additive of elementary copper is used, then it is expedient if the silver based solder contains an additive of copper oxide since the silver based solder will better wet ceramic surfaces due to the addition of the copper oxide.

Furthermore, the silver based solder may comprise a titanium additive for improving the wetting process.

For the purposes of decreasing the number of different components of the fuel cell stack, it is expedient if the sealing arrangement comprising the non conductive boundary layer is formed as a coating on a preferably metallic component of a fuel cell unit of the fuel cell stack.

Furthermore, provision may be made for the sealing arrangement comprising the non conductive boundary layer to be soldered to a preferably metallic component of a fuel cell unit of the fuel cell stack.

In a preferred embodiment of the method in accordance with the invention, provision is made for the metal of the ceramic metal layer to be at least partially converted into a non conductive metal oxide.

In particular, provision may be made for the metal of the ceramic metal layer to be at least partially converted into a non conductive metal oxide during a soldering process in an oxygen-containing atmosphere.

The further object of the present invention is to produce a sealing arrangement for a fuel cell stack of the type mentioned hereinabove which exhibits an adequate electrically insulating effect and which is of adequate mechanical rigidity even at a high operating temperature of the fuel cell stack.

In accordance with the invention, this object is achieved in the case of a sealing arrangement for a fuel cell stack which comprises a plurality of fuel cell units that succeed one another along a stack direction, wherein the sealing arrangement exhibits an electrically insulating effect, in that the sealing arrangement comprises at least one non conductive boundary layer formed from a mixture of a ceramic material and a non conductive metal compound that is formed in situ from a metal.

Special embodiments of such a sealing arrangement form the subject matter of the claims 34 to 58, the advantages thereof having already been explained hereinbefore in connection with the special embodiments of the method in accordance with the invention.

Claim 59 is directed toward a fuel cell stack which comprises a plurality of fuel cell units that succeed on another along a stack direction, and at least one sealing arrangement in accordance with the invention.

Further features and advantages of the invention form the subject matter of the following description and the graphic illustration of an exemplary embodiment.

BRIEF DESCRIPTION OF THE DRAWINGS

FIG. 9 a detail from FIG. 8 which shows a vertical section through just one fuel cell unit of the fuel cell stack;

FIG. 10 an enlarged exploded illustration of the region I in FIG. 9;

FIG. 12 a schematic vertical section through the fuel cell stack in the region of an oxidizing agent channel, along the line 12-12 in FIG. 6;

FIG. 13 a detail from FIG. 12 which shows a vertical section through just one fuel cell unit of the stack;

FIG. 15 a schematic vertical section through the fuel cell stack in a region outside the fluid channels, along the line 15-15 in FIG. 6; and FIG. 16 a detail from FIG. 15 which shows just one of the fuel cell units of the fuel cell stack.

Similar or functionally equivalent elements are designated by the same reference symbols in each of the Figures.

DETAILED DESCRIPTION OF THE INVENTION

A fuel cell stack bearing the general reference 100 that is illustrated in FIGS. 5 to 16 comprises a plurality of fuel cell units 102 which are each of identical construction and are stacked one on top of the other along a vertical stack direction 104.

Figure 1:
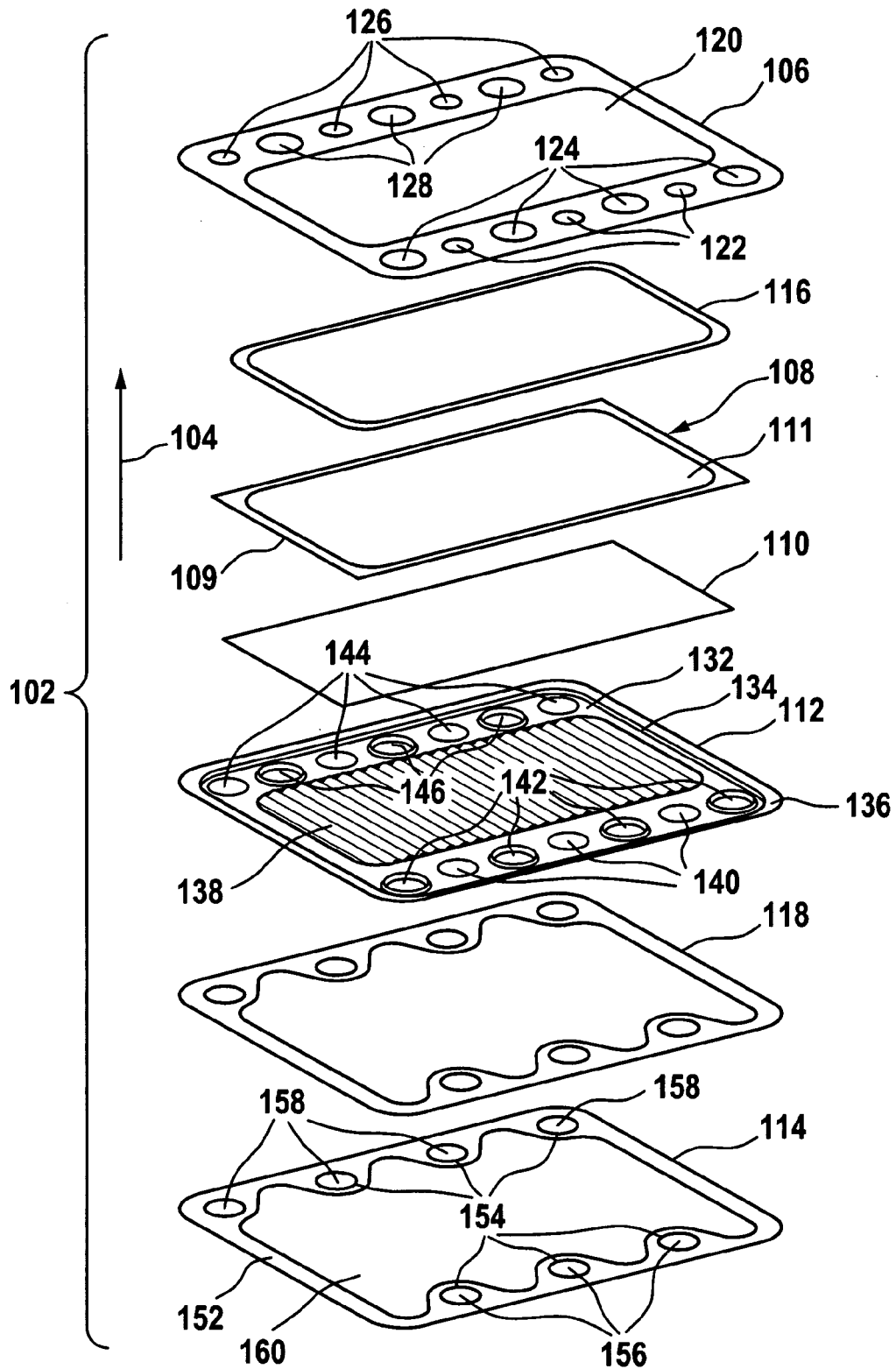
FIG. 1 shows a schematic exploded illustration of the elements of a fuel cell unit.

Each of the fuel cell units 102 comprises the components illustrated individually in FIG. 1, namely, an upper housing part 106, a cathode electrolyte anode unit (KEA unit) 108, a contact material 110, a lower housing part 112 and an intermediate element 114.

Furthermore, a solder layer 116 for soldering the KEA unit 108 to the upper housing part 106 and for connecting the intermediate element 114 to the lower housing part 112 in a gas-tight and electrically insulating manner is illustrated in FIG. 1.

The upper housing part 106 is in the form of a substantially rectangular and substantially flat metal sheet which is provided with a substantially rectangular central passage opening 120 through which, in the fully assembled state of the fuel cell unit, the KEA unit 108 of the fuel cell unit 102 is accessible for contact-making purposes by the lower housing part 112 of the fuel cell unit 102 located thereabove in the stack direction 104.

On the one side of the passage opening 120, the upper housing part 106 is provided with a plurality of, three for example, fuel gas supply openings 122 which are arranged to alternate with a plurality of, four for example, oxidizing agent supply openings 124.

On the opposite side of the passage opening 120, the upper housing part 106 is provided with a plurality of, four for example, fuel gas removal openings 126 which are arranged to alternate with a plurality of, three for example, oxidizing agent removal openings 128.

The upper housing part 106 is preferably made of a highly corrosion resistant steel, for example, from the alloy Crofer 22.

The material Crofer 22 has the following composition:

22 percentage weight chromium, 0.6 percentage weight aluminium, 0.3 percentage weight silicon, 0.45 percentage weight manganese, 0.08 percentage weight titanium, 0.08 percentage weight lanthanum, the remainder iron.

This material is sold by the company ThyssenKrupp VDM GmbH, Plettenberger Straße 2, 58791 Werdohl, Germany.

The KEA unit 108 comprises an anode 113, an electrolyte 109 arranged over the anode 113 and a cathode 111 arranged over the electrolyte 109.

The anode 113 is formed from a ceramic material, from $ZrO_2$ or from a $Ni/ZrO_2$-Cermet (ceramic metal mixture) for example, which is electrically conductive at the operating temperature of the fuel cell unit (from approximately 800° C. to approximately 900° C.), and is porous in order to enable a fuel gas to pass through the anode 113 to the electrolyte 109 adjoining the anode 113.

A hydrocarbon-containing gas mixture or pure hydrogen can be used as the fuel gas for example.

The electrolyte 109 is preferably in the form of a solid electrolyte, in particular, a solid oxide electrolyte, and consists of yttrium-stabilized zirconium dioxide for example.

The electrolyte 109 is electronically non-conductive at normal temperatures and also at the operating temperature. By contrast however, the ionic conductivity thereof rises with increasing temperature.

The cathode 111 is formed from a ceramic material which is electrically conductive at the operating temperature of the fuel cell unit, for example, from $(La_{0.8}Sr_{0.2})_{0.98}MnO_3$, and it is porous in order to enable an oxidizing agent, air or pure oxygen for example, to pass to the electrolyte 109 from an oxidizing agent chamber 130 adjoining the cathode 111.

The gas-tight electrolyte 109 of the KEA unit 108 extends up to the edge of the gas-permeable anode 113 and beyond the edge of the gas-permeable cathode 111.

The contact material 110 which is arranged between the KEA unit 108 and the lower housing part 112 can, for example, be in the form of a net, a weave or a fleece made of nickel wire.

The lower housing part 112 is in the form of a sheet metal shaped-part and comprises a substantially rectangular plate 132 which is directed perpendicularly to the stack direction 104, whilst the edges thereof merge via a bevelled portion 134 into an edge flange 136 that is likewise aligned substantially parallel to the stack direction 104.

The plate 132 comprises a substantially rectangular central contact field 138 which is provided with contact elements for making contact with the contact material 110 on the one hand and with the cathode 111 of a KEA unit 108 of a neighbouring fuel cell unit 102 on the other, wherein said elements may be corrugated or dimpled.

On the one side of the contact field 138, the plate 132 is provided with a plurality of, three for example, fuel gas supply openings 140 which are arranged to alternate with a plurality of, four for example, oxidizing agent supply openings 142.

The fuel gas supply openings 140 and the oxidizing agent supply openings 142 of the lower housing part 112 are in alignment with the respective fuel gas supply openings 122 and the oxidizing agent supply openings 124 of the upper housing part 106.

On the other side of the contact field 138, the plate 132 is provided with a plurality of, four for example, fuel gas removal openings 144 which are arranged to alternate with a plurality of, three for example, oxidizing agent removal openings 146.

The fuel gas removal openings 144 and the oxidizing agent removal openings 146 of the lower housing part 112 are in alignment with the respective fuel gas removal openings 126 and the oxidizing agent removal openings 128 of the upper housing part 106.

The oxidizing agent removal openings 146 are preferably located opposite the fuel gas supply openings 140, and the fuel gas removal openings 144 are preferably located opposite the oxidizing agent supply openings 142.

Figure 11:
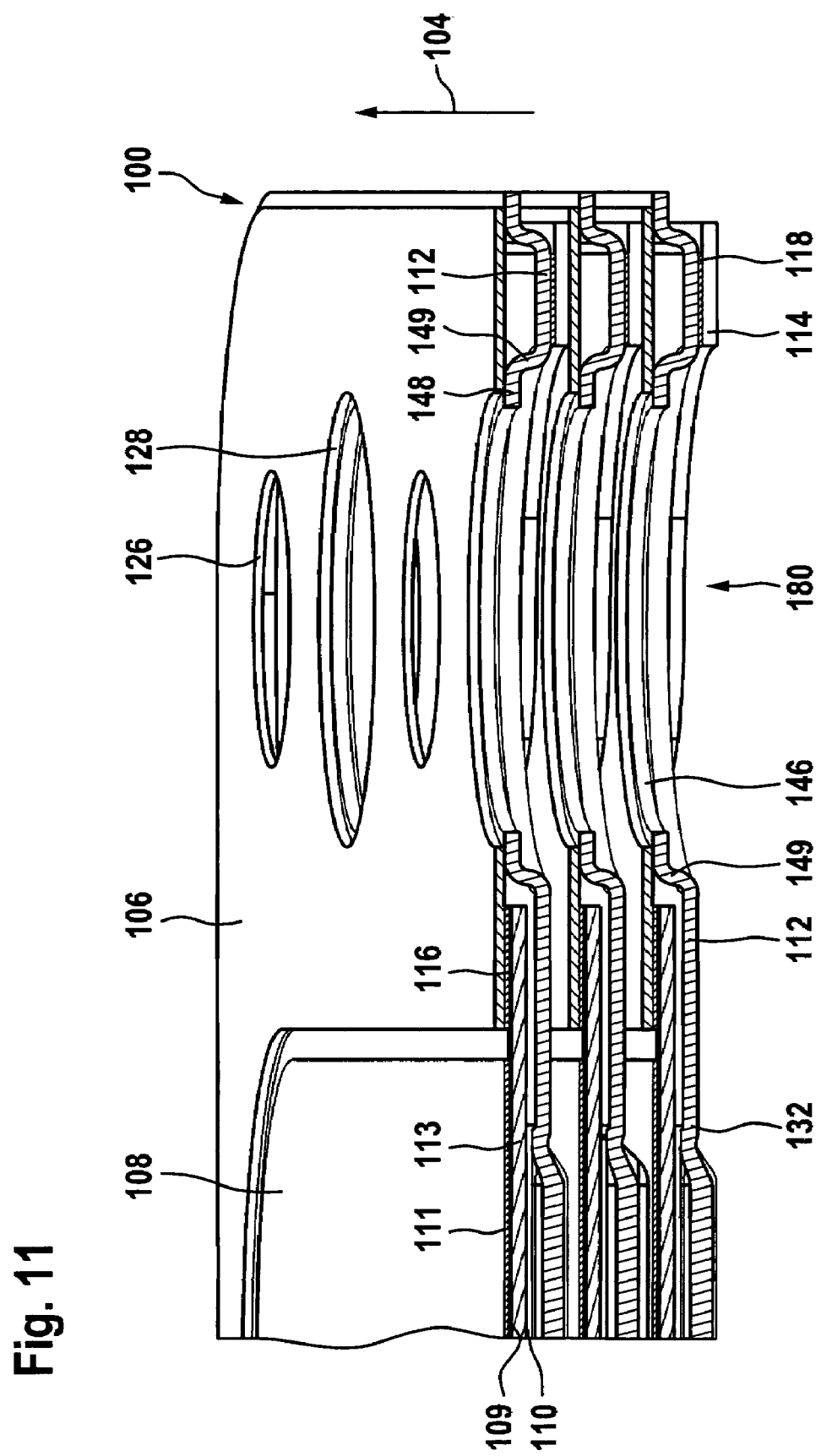
FIG. 11 a partially sectional detailed perspective illustration of the fuel cell stack in the region of an oxidizing agent channel.
Figure 14:
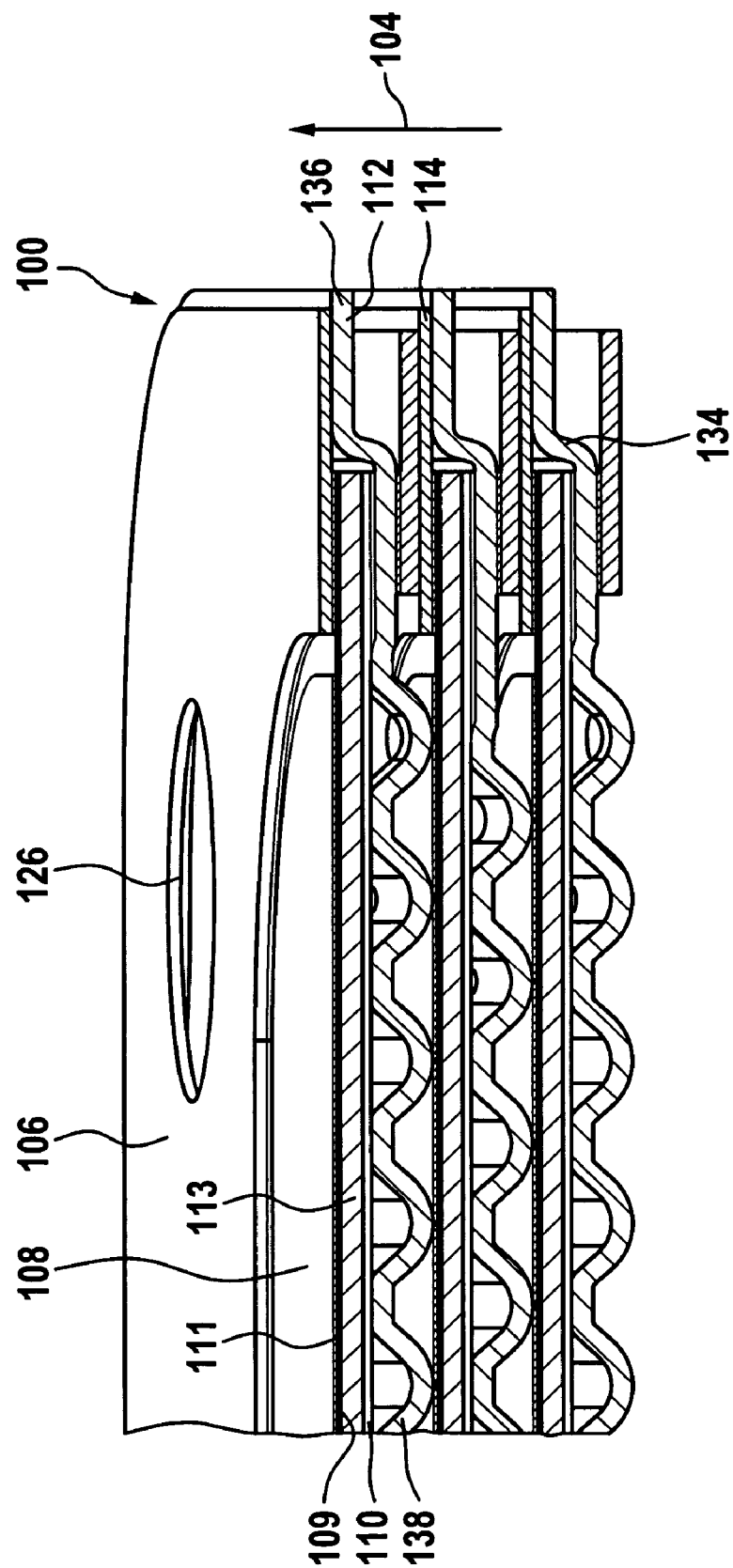
FIG. 14 a partially sectional detailed perspective illustration of the fuel cell stack in a region outside the fluid channels.

As can best be seen from FIGS. 11 to 13, the oxidizing agent removal openings 146 (in like manner to the oxidizing agent supply openings 142) of the lower housing part 112 are each surrounded by a ring flange 148 which surrounds the opening concerned in ring-like manner and is aligned substantially parallel to the stack direction 104 and which is connected to the plate 132 of the lower housing part 112 via a bevelled portion 149.

The lower housing part 112 is preferably made of a highly corrosion resistant steel, for example, from the already previously mentioned alloy Crofer 22.

The intermediate element 114 comprises a substantially rectangular frame part 152 which extends in ring-like manner along the edge of the fuel cell unit 102, as well as channel delimitation parts 154 which are connected in one-piece manner to the frame part 152 and which are formed in such a way that they, together with the frame part 152, respectively surround a fuel gas supply opening 156 and a fuel gas removal opening 158 of the intermediate element 114.

The fuel gas supply openings 156 and the fuel gas removal openings 158 of the intermediate element 114 are aligned with the respective fuel gas supply openings 140 and the fuel gas removal openings 144 of the lower housing part 112 as well as with the respective fuel gas supply openings 122 and with the fuel gas removal openings 126 of the upper housing part 106.

The intermediate element 114 is made from a substantially flat metal sheet by punching out the fuel gas supply openings 156 and the fuel gas removal openings 158 and also a central passage opening 160.

A highly corrosion resistant steel is preferably used for the material of the intermediate element 114, for example, from the already previously mentioned alloy Crofer 22 or FeCrAlY.

The composition of the FeCrAlY alloy is as follows: 30 percentage weight chromium; 5 percentage weight aluminium; 0.5 percentage weight yttrium; the remainder iron.

As can be seen from FIG. 10, the upper surface of the intermediate element 114 facing the lower housing part 112 is provided with a multi-layer sealing arrangement 118.

The sealing arrangement 118 comprises an insulating layer 162 which is arranged directly on the upper surface of the intermediate element 114, a non conductive boundary layer 192 which is arranged on the upper surface of the insulating layer 162 remote from the intermediate element 114 and a solder layer 190 which is arranged on the upper surface of the non conductive boundary layer 192 that is remote from the insulating layer 162.

The insulating layer 162 applied directly to the upper surface of the intermediate element 114 consists of a thermally sprayed ceramic, for example, of an aluminium magnesium spinel.

As an alternative or in addition to being applied to the upper surface of the intermediate element 114, the insulating layer 162 could also be applied to the lower surface of the lower housing part 112.

For the purposes of applying this electrically insulating, insulating layer 162 to the upper surface of the intermediate element 114 or the lower surface of the lower housing part 112 for example, the atmospheric plasma spraying process, the vacuum plasma spraying process or the flame spraying process are suitable. The high-speed vacuum plasma spraying process (High Velocity Vacuum Plasma Spraying, HV-VPS) is particularly suitable.

In the case of these methods, the surface of the intermediate element 114 that is to be coated with the insulating layer 162 is removed, preferably a plurality of times, by means of a jet spray, whereby a layer of thermally sprayed ceramic is formed during each removal process.

The layer thickness of the electrically insulating, insulating layer 162 amounts to 50 µm to 200 µm for example, preferably 100 µm to 140 µm.

The insulating layer 162 can, for example, be formed by repeatedly removing the surface of the intermediate element 114 that is to be coated, whereby the insulating layer 162 then consists of a plurality of layers of the thermally sprayed ceramic material that are deposited one above the other.

The non conductive boundary layer 192 of the sealing arrangement 118 arranged on the insulating layer 162 is in the form of a thermally sprayed Cermet layer whose metal component has been converted in situ into a non conductive metal compound.

For the purposes of producing the non conductive boundary layer 192, one proceeds as follows for example:

Firstly, a ceramic metal layer is produced on the insulating layer 162 from a mixture consisting of a powdered ceramic material and a powdered metal precursor by a thermal spraying process.

Hereby, a metal precursor is to be understood as being a metal compound which disintegrates at the working temperature of the thermal spraying process into its metallic component and its non-metallic component so that the metal component of the compound is present in the ceramic metal layer in a metallic form.

A thermally unstable compound of an active metal which disintegrates at the working temperature of the thermal spraying process is preferably used as the metal precursor.

Hereby, an "active metal" is to be understood as being a boundary-surface-active metal such as is added in small quantities to active solders (metallic alloys) in order to lower the boundary surface energy between a ceramic material and the solder melt to such an extent that wetting of the ceramic material by the solder can take place.

Such "active metals" are, in particular, the metals in the group titanium, zirconium, hafnium, niobium and tantalum.

Hydrides of these active metals are particularly suitable as the metal precursor.

Should titanium be introduced into the ceramic metal layer, then use is preferably made of titanium hydride as the metal precursor, resulting in disintegration of the titanium hydride into metallic titanium and hydrogen as from a temperature of approximately 400° C. Thus, in this case, a ceramic titanium layer ensues on the insulating layer 162 as a result of the thermal spraying process.

As an alternative or in addition to titanium hydride, elementary titanium can also be used.

Should zirconium be introduced into the ceramic metal layer, then use is preferably made of zirconium hydride as the metal precursor. In this case, a ceramic zirconium layer ensues on the insulating layer 162 as a result of the thermal spraying process.

Yttrium-stabilized zirconium dioxide (with an yttrium component measured in mol % of between 3% and 12%, preferably between 5% and 8%) or an aluminium magnesium spinel can be used as a powdered ceramic material for the formation of the ceramic metal layer for example.

The ratio, in parts by weight, between the ceramic material and the metal precursor (in particular, titanium hydride or zirconium hydride) in the mixture lies within a range of 5:1 to 30:1 for example, preferably within a range of 15:1 to 25:1. A mixture ratio of 20:1 is particularly expedient.

The layer thickness of the ceramic metal layer lies within a range of 10 µm to 80 µm for example, preferably within a range of 20 µm to 60 µm.

For the purposes of thermally spraying the ceramic metal layer onto the upper surface of the insulating layer 162 remote from the intermediate element 114, the atmospheric plasma spraying process, the vacuum plasma spraying process or the flame spraying process are suitable for example. The high-speed vacuum plasma spraying process (High Velocity Vacuum Plasma Spraying, HV-VPS) is particularly suitable.

The ceramic metal layer too is preferably produced in such a way that the upper surface of the insulating layer 162 that is to be coated is removed a plurality of times using a jet spray, whereby a plurality of layers of the ceramic metal layer are formed.

Thereby, during each process of removal of the surface that is to be coated, the ratio between the ceramic material and the metal precursor in the mixture can be altered in such a way that a mixture-ratio gradient running in the direction of the layer thickness (parallel to the stack direction 104) is developed.

This mixture-ratio gradient is directed in such a way that the part-by-weight of the metal in the entire material of the ceramic metal layer increases with increasing distance from the upper surface of the insulating layer 162.

During subsequent soldering of the thus produced ceramic metal layer to the lower surface of the lower housing part 112 in an air atmosphere or in a vacuum wherein a partial pressure of oxygen still exists, the metal component of the ceramic metal layer is converted into a non conductive metal oxide so that the non conductive boundary layer 192 is formed from the ceramic metal layer. A solder joint of high mechanical rigidity and high electrical resistance thereby develops.

Due to the good electrically insulating effect of the non conductive boundary layer 192, it is not necessary to let the insulating layer 162 project laterally beyond the non conductive boundary layer 192 in order to prevent the occurrence of a short-circuit.

Rathermore, the insulating layer 162 and the ceramic metal layer from which the non conductive boundary layer 192 is then subsequently developed can be produced together in non-overlapping manner using the same coating masks. The expenditure on apparatus for the production of the sealing arrangement 118 is thereby reduced.

If the ceramic metal layer contains metallic titanium, then the latter is converted into non conductive titanium dioxide during the soldering process in the oxygen-containing atmosphere.

A silver based solder can be used for soldering the ceramic metal layer to the lower housing part 112 and for the production of the solder layer 190 for example.

In particular, a silver based solder with an additive of elementary copper can be used as the solder material, for example, a silver based solder with the composition (in mol %): Ag-4Cu or Ag-8Cu.

The process of soldering this solder material to the lower surface of the lower housing part 112 and to the ceramic metal layer takes place in an air atmosphere. The soldering temperature lies within a range of approximately 980° C. to approximately 1,050° C., the duration of the soldering process amounts to approximately 5 minutes for example. Copper oxide and an oxide of the metal contained in the ceramic metal layer are formed in situ during the process of soldering in air.

As an alternative thereto, the solder material could also be in the form of a silver based solder without an additive of elementary copper. Such a copper-free solder offers the advantage of a higher solidus temperature (this amounts to approximately 960° C. without a copper additive, to approximately 780° C. with a copper additive). Since pure silver does not wet ceramic surfaces, copper(II)oxide is added to the silver based solders without a copper additive for the purposes of reducing the edge angle. The soldering process using silver based solders without a copper additive takes place in an air atmosphere or in a vacuum wherein a partial pressure of oxygen still exists.

Suitable silver based solders without an additive of elementary copper have the composition (in mol %): Ag-4CuO or Ag-8CuO for example.

An additive of titanium to the solder material can serve for the purposes of further improving the wetting action (reduction of the edge angle). An intimate mixture of the appropriate components in powder form is used for the purposes of producing the solders. The solder alloy is formed in situ from this mixture. The titanium is added to this mixture in the form of titanium hydride. Metallic titanium is formed from the hydride at approximately 400° C.

Suitable silver based solders without an additive of elementary copper, but with an additive of titanium have the composition (in mol %): Ag-4CuO-0.5Ti or Ag-8CuO-0.5Ti for example.

In this case too, the soldering temperature preferably amounts to between approximately 980° C. and approximately 1,050° C., the duration of the soldering process to approximately 5 minutes for example.

Furthermore, active solders can also be used for the soldering process.

Active solders are metallic alloys which contain boundary-surface-active elements (e.g. titanium, zirconium, hafnium, niobium and/or tantalum) in small quantities and are thus able to lower the boundary surface energy between a ceramic material and the solder melt to such an extent that wetting of the ceramic material by the solder can take place.

The active soldering technique using active solders enables ceramic/ceramic metal compounds to be produced in the course of a single-step jointing process, without preceding metallization of the ceramic jointing surfaces. The wetting of the ceramic jointing surfaces by the solder is ensured here by the use of an active solder.

For example, a suitable active solder is sold under the designation Copper ABA by the company Wesgo Metals, 610 Quarry Road, San Carlos, Calif. 94070, USA, or by the company Wesgo Metals, 2425 Whipple Road, Hayward, Calif. 94544, USA.

This active solder has the following composition: 2 percentage weight Al; 92.7 percentage weight Cu; 3 percentage weight Si; 2.3 percentage weight Ti.

This active solder is preferably used at a soldering temperature of from approximately 1,030° C. to approximately 1,080° C.

Due to the fact that the sealing arrangement 118 has the non conductive boundary layer 192 arranged between the solder layer 190 and the insulating layer 162, there are no short-circuits caused by solder penetrating into the insulating layer 162 so that the sealing arrangement 118 can exercise its electrically insulating function in perfect manner.

For the purposes of producing the fuel cell units 102 illustrated in FIG. 4 from the previously described individual components, one proceeds as follows:

Firstly, the intermediate element 114 is provided with the insulating layer 162 and the ceramic metal layer, which still contains unoxidized metal material, in the previously described manner.

Subsequently, the electrolyte 109 of the KEA unit 108 is soldered along the edge of the upper surface thereof to the upper housing part 106, namely, to the lower surface of the region of the upper housing part 106 surrounding the passage opening 120 in the upper housing part 106.

The soldering material needed for this process can, as illustrated in FIG. 1, be inserted in the form of a suitably cut soldering foil 116 between the electrolyte 109 and the upper housing part 106 or else it could be applied in the form of a bead of soldering material to the upper surface of the electrolyte 109 and/or to the lower surface of the upper housing part 106 by means of a dispenser. Furthermore, it is also possible for the soldering material to be applied to the upper surface of the electrolyte 109 and/or to the lower surface of the upper housing part 106 by means of a pattern printing process, a silk-screen printing process for example.

A silver based solder with a copper additive can be used as the soldering material, for example, a silver based solder with the composition (in mol %): Ag4Cu or Ag8Cu.

The soldering process takes place in an air atmosphere. The soldering temperature amounts to 1050° C. for example, the duration of the soldering process to approximately 5 minutes for example. Copper oxide forms in situ during the process of soldering in air.

As an alternative thereto, a silver based solder without a copper additive could also be used as the soldering material. Such a copper-free solder offers the advantage of a higher solidus temperature (this amounts to approximately 960° C., without a copper additive, to approximately 780° C. with a copper additive). Since pure silver does not wet ceramic surfaces, Copper(II)oxide is added to the silver based solders without a copper additive for the purposes of reducing the edge angle. The soldering process using silver based solders without a copper additive takes place in an air atmosphere or in an inert gas atmosphere, for example under argon.

In this case too, the soldering temperature preferably amounts to approximately 1050° C., the duration of the soldering process to approximately 5 minutes for example.

As an alternative to soldering the KEA unit 108 into the upper housing part 106, provision could also be made for a substrate, on which the KEA unit 108 has not yet been produced, to be welded to the upper housing part 106 and, after the welding process, the electro-chemically active layers of the KEA unit 108, i.e. the anode, electrolyte and cathode thereof, are produced successively using the vacuum plasma spraying process on the substrate that has already been welded to the upper housing part 106.

Figure 2:
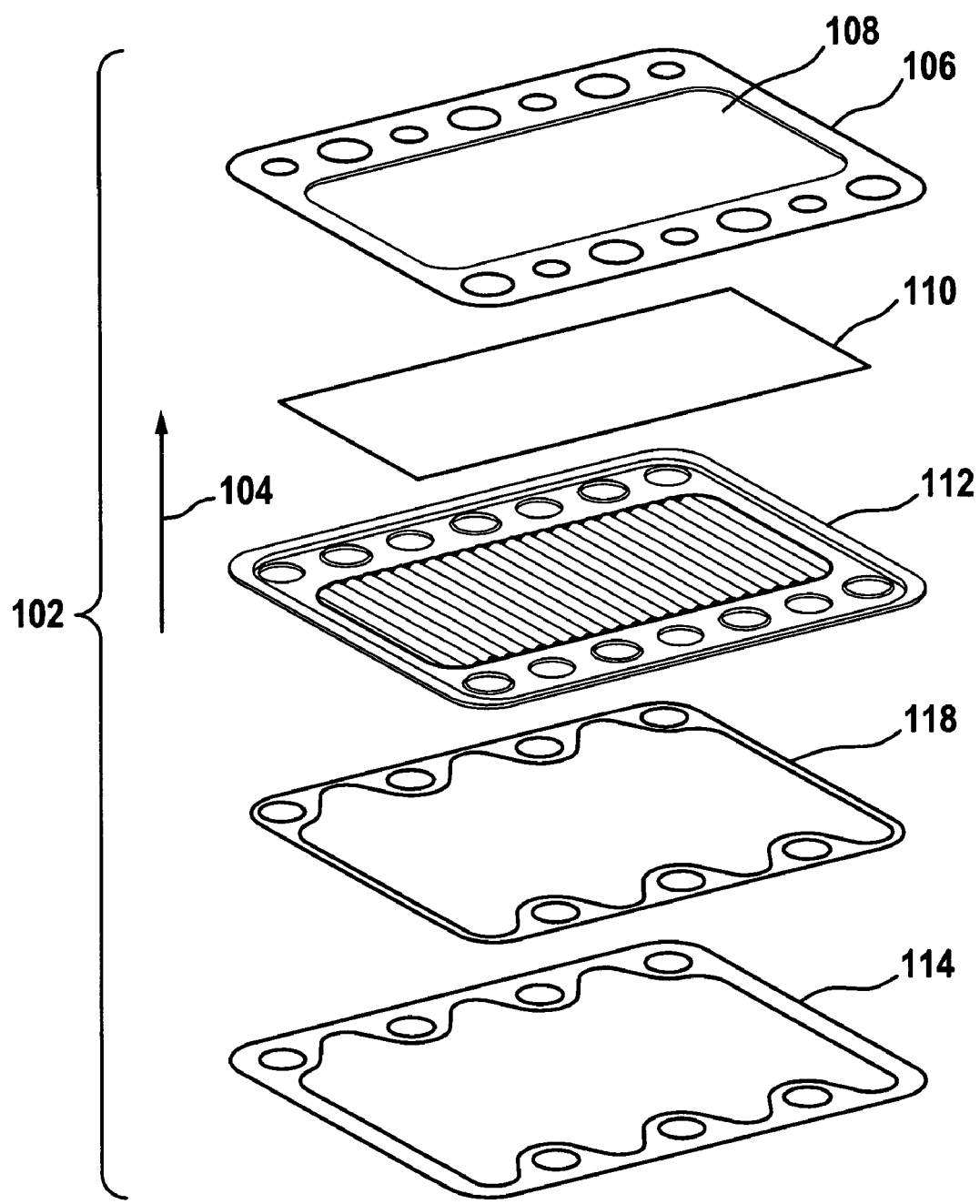
FIG. 2 a schematic exploded illustration of the fuel cell unit of FIG. 1, after a KEA (Cathode Electrolyte Anode) unit of the fuel cell unit has been soldered to an upper housing part of the fuel cell unit.

After the connection of the KEA unit 108 to the upper housing part 106, the state illustrated in FIG. 2 is reached.

The side of the intermediate element 114 provided with the sealing arrangement 118 and facing the lower housing part 112 is then soldered to the side of the lower housing part 112 facing the intermediate element 114 by means of the soldering material of the solder layer 190.

The soldering process is effected in an oxygen-containing atmosphere and can in all other respects take place under the same conditions as were described hereinbefore in connection with the process of soldering the electrolyte 109 and the upper housing part 106.

The necessary soldering material can be inserted in the form of a suitably cut soldering foil between the intermediate element 114 and the lower housing part 112, or else it could be applied in the form of a bead of soldering material to the upper surface of the sealing arrangement 118 and/or to the lower surface of the lower housing part 112 by means of a dispenser. Furthermore, it is also possible for the soldering material to be applied to the upper surface of the sealing arrangement 118 and/or to the lower surface of the lower housing part 112 partially or in its entirety by means of a pattern printing process, a silk-screen printing process for example.

Moreover, it is possible for the solder layer 190 to be produced on the upper surface of the ceramic metal layer of the sealing arrangement 118 by a thermal spraying process, in particular, by an atmospheric plasma spraying process, a vacuum plasma spraying process or a flame spraying process and thereafter to be soldered to the lower housing part 112. The high-speed vacuum plasma spraying process (High Velocity Vacuum Plasma Spraying, HV-VPS) is particularly suitable.

Figure 3:
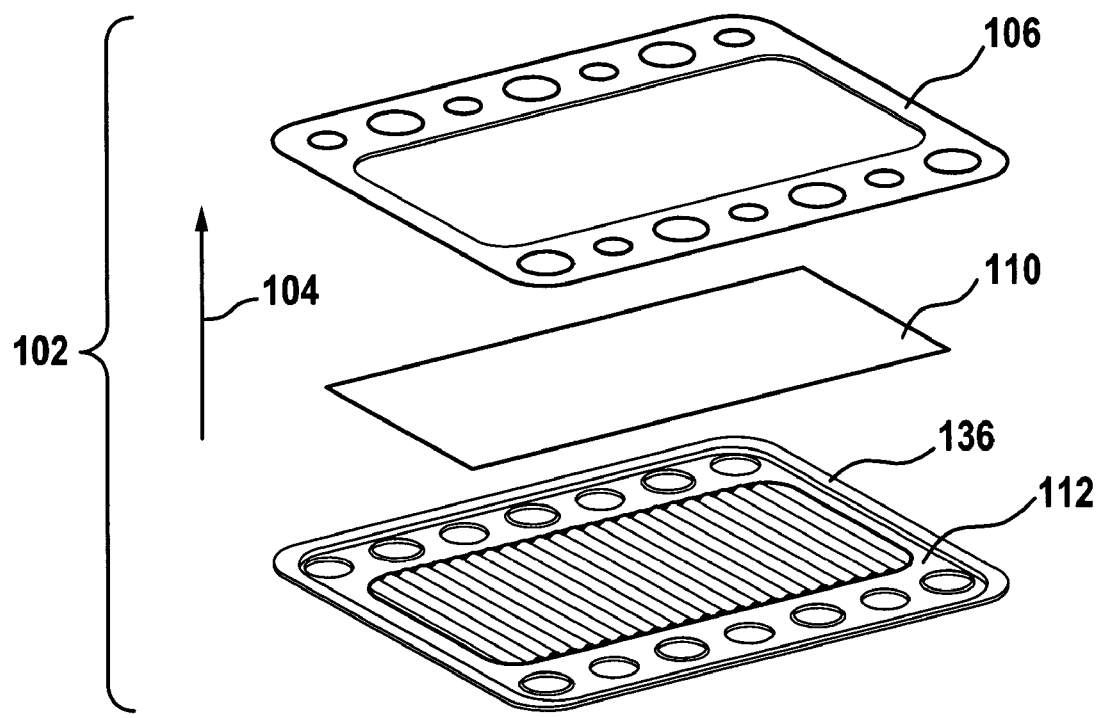
FIG. 3 a schematic exploded illustration of the fuel cell unit of FIG. 2, after an intermediate element of the fuel cell unit has been soldered to a lower housing part of the fuel cell unit.

After the intermediate element 114 has been soldered to the lower housing part 112, the state illustrated in FIG. 3 is reached.

Nevertheless, it is also possible for the intermediate element 114 to be soldered to the lower housing part 112 before the KEA unit 108 is connected to the upper housing part 106, or, the connection of the intermediate element 114 and the lower housing part 112 on the one hand and the KEA unit 108 and the upper housing part 106 on the other can take place at one and the same time.

Subsequently, the contact material 110, a nickel net for example, is inserted between the lower housing part 112 and the upper housing part 106, and then the lower housing part 112 and the upper housing part 106 are welded together in gas-tight manner along a welding seam 164 which runs along the outer edge of the edge flange 136 of the lower housing part 112 and the outer edge of the upper housing part 106, and along welding seams 166 which run along the inner edges of the ring flange 148 of the lower housing part 112 and the respective edges of the oxidizing agent supply openings 124 and the oxidizing agent removal openings 128 of the upper housing part 106.

Figure 4:
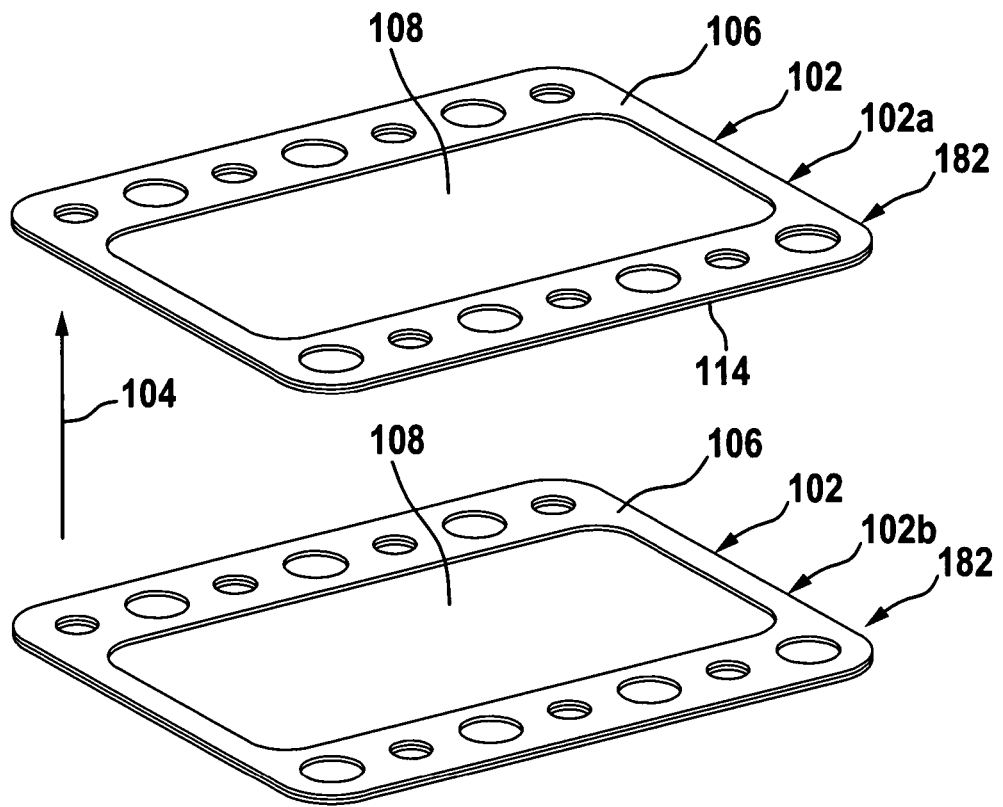
FIG. 4 a schematic exploded illustration of the fuel cell unit of FIG. 3, after the upper housing part and the lower housing part have been welded to one another, and of a further second fuel cell unit of identical construction which is arranged below this said first fuel cell unit in the stack direction of a fuel cell stack.
Figure 5:
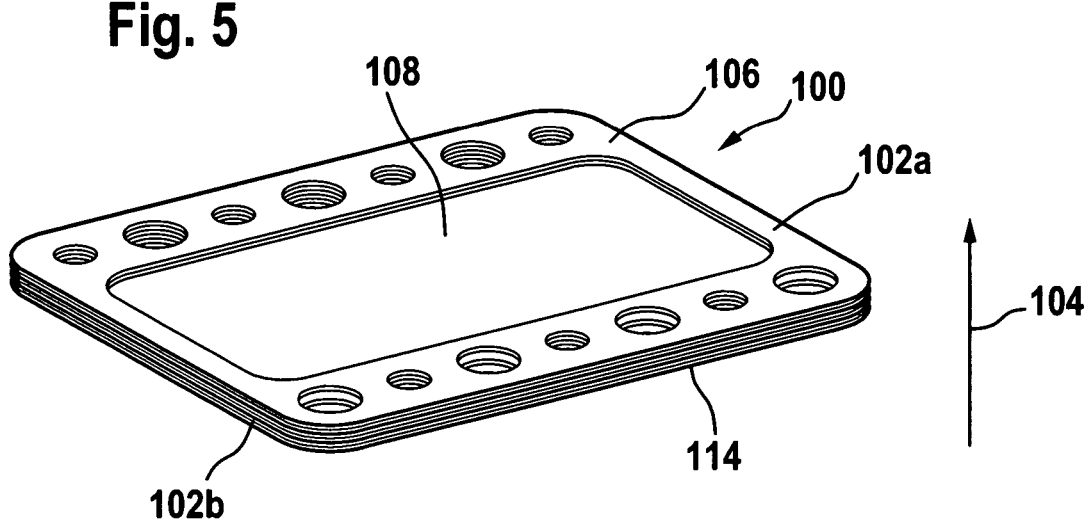
FIG. 5 a schematic perspective illustration of the two fuel cell units of FIG. 4, after the additional element of the first fuel cell unit has been welded to the upper housing part of the second fuel cell unit.
Figure 6:
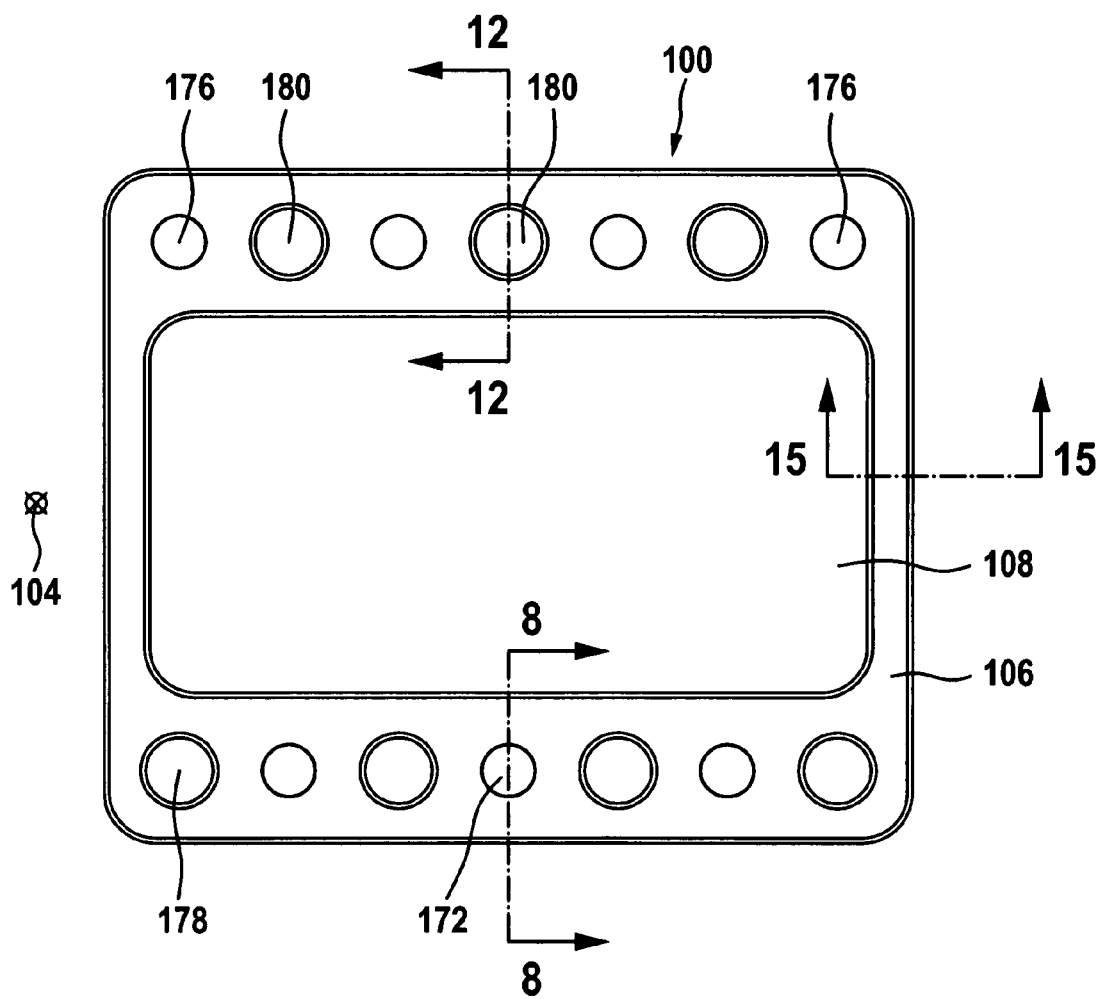
FIG. 6 a schematic plan view from above of a fuel cell stack.
Figure 7:
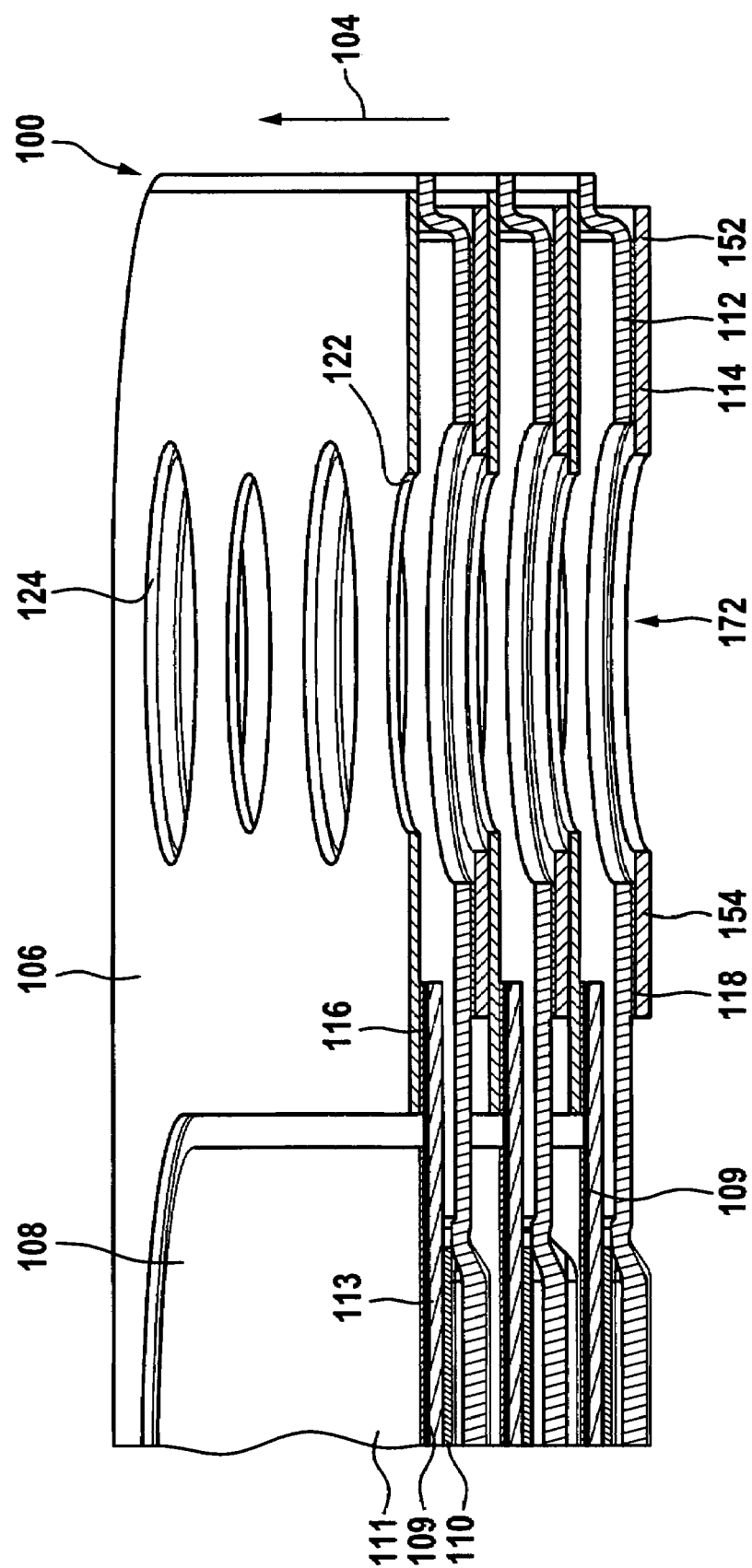
FIG. 7 a partially sectional detailed perspective view of the fuel cell stack in the region of a fuel gas channel.
Figure 8:
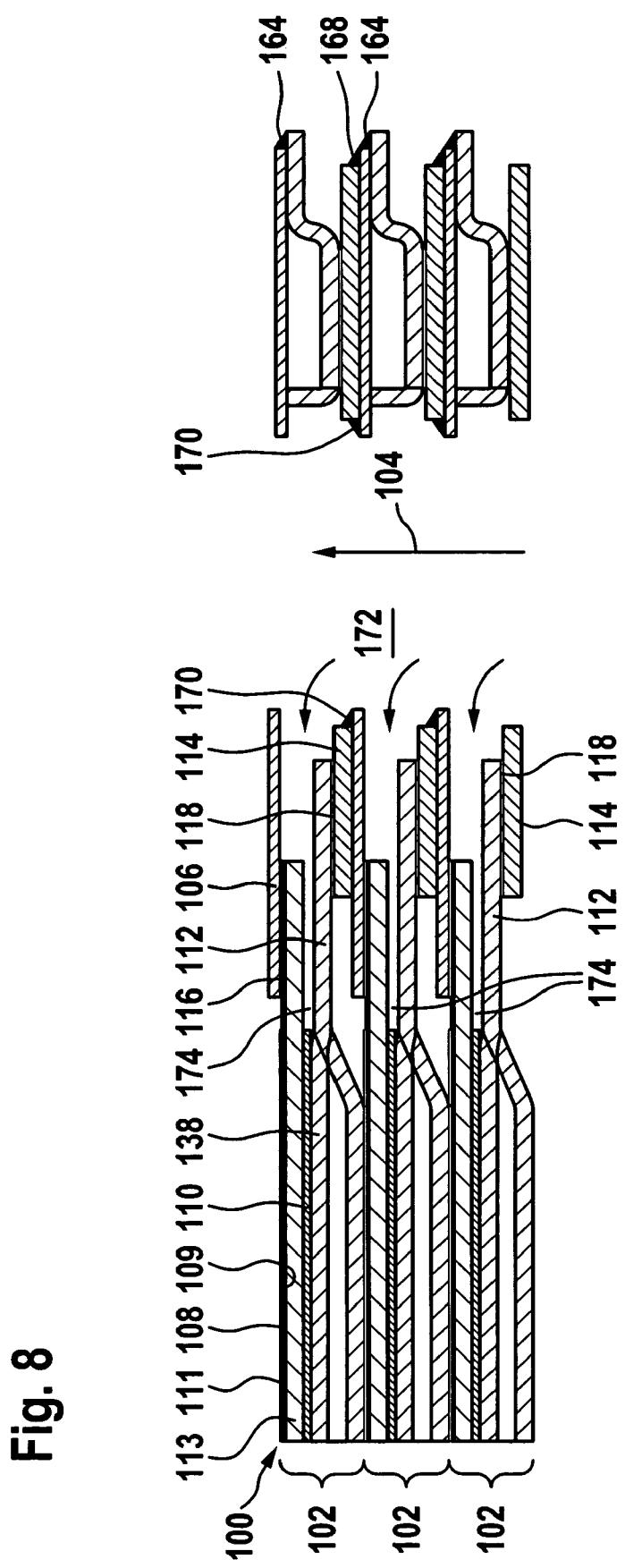
FIG. 8 a schematic vertical section through the fuel cell stack in the region of a fuel gas channel, along the line 8-8 in FIG. 6.

Following this method step, the state illustrated in FIG. 4 is reached wherein there are now fully assembled fuel cell units 102 although these still need to be connected together in order to form a fuel cell stack 100 from a plurality of fuel cell units 102 which succeed one another in the stack direction 104.

The connection of two fuel cell units 102 which succeed one another in the stack direction 104 is effected in the following manner:

A first fuel cell unit 102a and a second fuel cell unit 102b are inserted into a welding jig in such a manner that the upper surface of the upper housing part 106 of the second fuel cell unit 102b rests flatly against the lower surface of the intermediate element 114 of the first fuel cell unit 102a.

Thereafter, the intermediate element 114 of the first fuel cell unit 102a is welded to the upper housing part 106 of the second fuel cell unit 102b in gas-tight manner by means of a welding seam 168 which runs along the outer edges of the intermediate element 114 and the upper housing part 106, and by means of welding seams 170 which respectively extend around the edges of the fuel gas supply openings 156 of the intermediate element 114 and the edges of the fuel gas supply openings 122 of the upper housing part 106 that are aligned therewith and around the edges of the fuel gas removal openings 158 of the intermediate element 114 and the edges of the fuel gas removal openings 126 of the upper housing part 106 that are aligned therewith.

After two fuel cell units 102 have been connected together in this way, the fuel cell stack 100 can be gradually built up by successively welding further fuel cell units 102 to the intermediate element 114 of the second fuel cell unit 102b or to the upper housing part 106 of the first fuel cell unit 102a in the stack direction 104 until the desired number of fuel cell units 102 is attained.

In the finished fuel cell stack 100, the respective mutually aligned fuel gas supply openings 122, 140 and 156 of the upper housing parts 106, the lower housing parts 112 and the intermediate elements 114 form a respective fuel gas supply channel 172 which, in each fuel cell unit 102 between the upper surface of the lower housing part 112 and the lower surface of the upper housing part 106, opens into a fuel gas chamber 174 which is formed between the upper surface of the contact field 138 of the lower housing part 112 on the one hand and the lower surface of the KEA unit 108 on the other.

The respective mutually aligned fuel gas removal openings 126, 144 and 158 of the upper housing parts 106, the lower housing parts 112 and the intermediate elements 114 form a respective fuel gas removal channel 176 which is open to the fuel gas chamber 174 in the region between the upper surface of the lower housing part 112 and the lower surface of the upper housing part 106 on the side of each fuel cell unit 102 located opposite the fuel gas supply channels 172.

The respective mutually aligned oxidizing agent supply openings 124 and 142 of the upper housing parts 106 and the lower housing parts 112 and also the regions of the passage openings 160 in the intermediate elements 114 located between the channel delimitation parts 154 of the fuel gas supply openings 140 of the intermediate elements 114 together form a respective oxidizing agent supply channel 178 which is open to the oxidizing agent chamber 130 of the fuel cell unit 102 in the region of each fuel cell unit 102 between the upper surface of the upper housing part 106 and the lower surface of the lower housing part 112 of the fuel cell unit 102 located thereabove in the stack direction 104.

In like manner, the respective mutually aligned oxidizing agent removal openings 128 and 146 of the upper housing parts 106 and the lower housing parts 112 together with the regions of the passage openings 160 in the intermediate elements 114 located between the channel delimitation parts 154 of the fuel gas removal openings 144 of the intermediate elements 114 form a respective oxidizing agent removal channel 180 which is arranged on the side of the fuel cell units 102 located opposite to the oxidizing agent supply channels 178 and likewise opens into the oxidizing agent chamber 130 of the fuel cell unit 102 in the region of each fuel cell unit 102 between the upper surface of the upper housing part 106 and the lower surface of the lower housing part 112 of the fuel cell unit 102 located thereabove it in the stack direction 104.

In operation of the fuel cell stack 100, a fuel gas is supplied to the fuel gas chamber 174 of each fuel cell unit 102 by way of the fuel gas supply channels 172 and the exhaust gas produced by oxidation at the anode 113 of the KEA unit 108 as well as any unused fuel gas is removed from the fuel gas chamber 174 through the fuel gas removal channels 176.

In like manner, an oxidizing agent, air for example, is supplied to the oxidizing agent chamber 130 of each fuel cell unit 102 through the oxidizing agent supply channels 178 and any unused oxidizing agent is removed from the oxidizing agent chamber 130 through the oxidizing agent removal channels 180.

In operation of the fuel cell stack 100, the KEA units 108 are, for example, at a temperature of 850° C. at which the electrolyte 109 of each KEA unit 108 is conductive for oxygen ions. The oxidizing agent from the oxidizing agent chamber 130 picks up electrons at the cathode 111 and delivers doubly negatively charged oxygen ions to the electrolyte 109, said ions then migrating through the electrolyte 109 to the anode 113. At the anode 113, the fuel gas from the fuel gas chamber 174 is oxidized by the oxygen ions from the electrolyte 109 and thereby donates electrons to the anode 113.

The electrons freed by the reaction at the anode 113 are supplied from the anode 113 via the contact element 110 and the lower housing part 112 to the cathode 111 of a neighbouring fuel cell unit 102 adjoining the lower surface of the contact field 138 of the lower housing part 112 and thus make the cathode reaction possible.

The lower housing part 112 and the upper housing part 106 of each fuel cell unit 102 are connected together in electrically conductive manner by the welding seams 164, 166.

However, the housings 182 of the fuel cell units 102 which succeed one another in the stack direction 104 that are formed in each case by an upper housing part 106, a lower housing part 112 and an intermediate element 114 are electrically insulated from one another by the sealing devices 118 between the upper surface of the intermediate elements 114 and the lower surface of the lower housing parts 112. At the same time hereby, a gas-tight connection between these components is ensured by the process of soldering the intermediate elements 114 to the lower housing parts 112 so that the oxidizing agent chambers 130 and the fuel gas chambers 174 of the fuel cell units 102 are separated from one another and from the environment of the fuel cell stack 100 in gas-tight manner.

The invention claimed is:

1. A method of producing an electrically insulating sealing arrangement for a fuel cell stack which comprises a plurality of fuel cell units that succeed one another along a stack direction comprising the following method steps:

producing a ceramic metal layer from a mixture of a ceramic material and a metal material and/or a metal precursor;

producing a metallic layer in addition to the ceramic metal layer; and at least partially converting the metal of the ceramic metal layer into an electrically non conductive metal compound so as to produce a non conductive boundary layer.

2. A method in accordance with claim 1, wherein the ceramic metal layer is in the form of a Cermet layer.

3. A method in accordance to claim 1, wherein the ceramic metal layer is produced by a thermal spraying process.

4. A method in accordance with claim 3, wherein the ceramic metal layer is produced by a high-velocity vacuum plasma spraying process.

5. The method of claim 3 wherein the thermal spraying process comprises an atmospheric plasma spraying process.

6. The method of claim 3 wherein the thermal spraying process comprises a vacuum plasma spraying process.

7. The method of claim 3 wherein the thermal spraying process comprises a flame spraying process.

8. A method in accordance with claim 1, wherein the ceramic metal layer is formed from a mixture of a powdered ceramic material and a powdered metal and/or a powdered metal precursor.

9. A method in accordance with claim 1, wherein there is used a metal material and/or a metal precursor which comprises an active metal.

10. A method in accordance with claim 1, wherein a metal material and/or a metal precursor is used which comprises a metal from the group titanium, zirconium, hafnium, niobium, tantalum, silicon, cerium, vanadium.

11. A method in accordance with claim 1, wherein a hydride of an active metal is used as the metal precursor.

12. A method in accordance with claim 1, wherein a ceramic material which comprises aluminium oxide and/or titanium dioxide and/or zirconium dioxide and/or magnesium oxide is used for the production of the ceramic metal layer.

13. A method in accordance with claim 1, wherein a ceramic material which comprises yttrium-stabilized zirconium dioxide is used for the production of the ceramic metal layer.

14. A method in accordance with claim 1, wherein a ceramic material which comprises an aluminium magnesium spinel is used for the production of the ceramic metal layer.

15. A method in accordance with claim 1, wherein, for the purposes of producing the ceramic metal layer, there is used a mixture consisting of a ceramic material and a metal material and/or a metal precursor, in which the average ratio of the ceramic material in the mixture to the metal material, to the metal precursor or to the sum of the metal material and the metal precursor, in parts by weight, amounts to from approximately 5:1 up to approximately 30:1.

16. The method of claim 15 wherein the average ratio is from approximately 15:1 up to approximately 25:1.

17. A method in accordance with claim 1, wherein the ratio of the ceramic material in the mixture to the metal material, to the metal precursor or to the sum of the metal material and the metal precursor is varied during the process of producing the ceramic metal layer.

18. A method in accordance with claim 17, wherein the non conductive boundary layer that has been produced is soldered to a component of the fuel cell stack by means of a metallic solder layer, and in that the ratio of the ceramic material in the mixture to the metal material, to the metal precursor or to the sum of the metal material and the metal precursor is varied during the production of the ceramic metal layer in such a way that the part-by-weight of the metal material in the non conductive boundary layer increases with decreasing distance from the solder layer that is to be subsequently applied.

19. A method in accordance with claim 1, wherein the ceramic metal layer is produced with an average layer thickness of approximately 10 μm up to approximately 80 μm.

20. The method of claim 19 wherein the average layer thickness is approximately 20 μm up to approximately 60 μm.

21. A method in accordance with claim 1, wherein an insulating layer consisting of an electrically insulating ceramic material is formed in addition to the non conductive boundary layer.

22. A method in accordance with claim 21, wherein the non conductive boundary layer is soldered to a component of the fuel cell stack by means of a metallic solder layer, and in that the insulating layer is produced in such a way that it is arranged on the side of the non conductive boundary layer remote from the solder layer.

23. A method in accordance with claim 21, wherein the insulating layer is produced by thermal spraying.

24. A method in accordance with claim 23, wherein the insulating layer is produced by a high-velocity vacuum plasma spraying process.

25. The method of claim 23 wherein the insulating layer is produced by atmospheric plasma spraying.

26. The method of claim 23 wherein the insulating layer is produced by vacuum plasma spraying.

27. The method of claim 23 wherein the insulating layer is produced by flame spraying.

28. A method in accordance with claim 21, wherein for the purposes of producing the insulating layer, there is used a ceramic material which comprises aluminium oxide and/or titanium dioxide and/or zirconium dioxide and/or magnesium oxide.

29. A method in accordance with claim 21, wherein for the purposes of producing the insulating layer, there is used a ceramic material which comprises an aluminium magnesium spinel.

30. A method in accordance with claim 21, wherein the insulating layer is produced with an average layer thickness of approximately 50 μm up to approximately 200 μm.

31. The method of claim 30 wherein the average layer thickness is approximately 100 μm up to approximately 140μm.

32. A method in accordance with claim 1, wherein a metallic solder layer is produced in addition to the ceramic metal layer.

33. A method in accordance with claim 32, wherein the solder layer is at least partly produced by a process of thermally spraying solder material.

34. A method in accordance with claim 32, wherein for the purposes of producing the solder layer, a silver based solder including an additive of elementary copper is used.

35. A method in accordance with claim 32, wherein for the purposes of producing the solder layer, a silver based solder without the addition of elementary copper is used.

36. A method in accordance with claim 35, wherein for the purposes of producing the solder layer, there is used a silver based solder which contains an additive of copper oxide.

37. A method in accordance with claim 32, wherein for the purposes of producing the solder layer, there is used a silver based solder including a titanium additive.

38. A method in accordance with claim 1, wherein the sealing arrangement comprising the non conductive boundary layer is formed as a coating on a preferably metallic component of a fuel cell unit of the fuel cell stack.

39. A method in accordance with claim 1, wherein the sealing arrangement comprising the non conductive boundary layer is soldered to a preferably metallic component of a fuel cell unit of the fuel cell stack.

40. A method in accordance with claim 1, wherein the metal of the ceramic metal layer is at least partially converted into a non conductive metal oxide.

41. A method in accordance with claim 1, wherein the metal of the ceramic metal layer is at least partially converted into a non conductive metal oxide during a soldering process in an oxygen-containing atmosphere.

42. A sealing arrangement for a fuel cell stack which comprises a plurality of fuel cell units that succeed one another along a stack direction, wherein the sealing arrangement exhibits an electrically insulating effect, wherein the sealing arrangement comprises at least one non conductive boundary layer which is formed from a mixture of a ceramic material and a non conductive metal compound formed in situ from a metal; and a metallic layer in addition to the non conductive boundary layer.

43. A sealing arrangement in accordance with claim 42, wherein the non conductive metal compound comprises a compound of a metal.

44. A sealing arrangement in accordance with claim 43, wherein the non conductive metal compound comprises a compound of a metal from the group titanium, zirconium, hafnium, niobium, tantalum, silicon, cerium, vanadium.

45. A sealing arrangement in accordance with claim 42, wherein the ceramic material of the non conductive boundary layer comprises yttrium-stabilized zirconium dioxide.

46. A sealing arrangement in accordance with claim 42, wherein the ceramic material of the non conductive boundary layer comprises an aluminium magnesium spinel.

47. A sealing arrangement in accordance with claim 42, wherein the average ratio of the ceramic material in the mixture to the non conductive metal compound of the non conductive boundary layer amounts, in parts by weight, to from approximately 5:1 to approximately 30:1.

48. The method of claim 47 wherein the average ratio is from approximately 15:1 to approximately 25:1.

49. A sealing arrangement in accordance with claim 42, wherein the ratio of the ceramic material in the mixture to the non conductive metal compound in the non conductive boundary layer varies in the direction of the layer thickness.

50. A sealing arrangement in accordance with claim 49, wherein the non conductive boundary layer is soldered to a component of the fuel cell stack by means of a metallic solder layer, and in that the part-by-weight of the non conductive metal compound in the non conductive boundary layer decreases with increasing distance from the solder layer.

51. A sealing arrangement in accordance with claim 42, wherein the average layer thickness of the non conductive boundary layer amounts to from approximately 10 μm to approximately 80 μm.

52. The method of claim 51 wherein the average layer thickness is from approximately 20 μm to approximately 60 μm.

53. A sealing arrangement in accordance with claim 42, wherein the sealing arrangement comprises an insulating layer consisting of an electrically insulating ceramic material in addition to the non conductive boundary layer.

54. A sealing arrangement in accordance with claim 53, wherein the non conductive boundary layer is soldered to a component of the fuel cell stack by means of a metallic solder layer, and in that the insulating layer is arranged on the side of the non conductive boundary layer remote from the solder layer.

55. A sealing arrangement in accordance with claim 53, wherein the insulating layer is a thermally sprayed layer.

56. A sealing arrangement in accordance with claim 55, wherein the insulating layer is a high-velocity vacuum-plasma-sprayed layer.

57. The method of claim 55 wherein the insulating layer is atmospherically plasma-sprayed.

58. The method of claim 55 wherein the insulating layer is vacuum plasma-sprayed.

59. The method of claim 55 wherein the insulating layer is flame-sprayed.

60. A sealing arrangement in accordance with claim 53, wherein the ceramic material of the insulating layer comprises aluminium oxide and/or titanium dioxide and/or zirconium dioxide and/or magnesium oxide.

61. A sealing arrangement in accordance with claim 53, wherein the ceramic material of the insulating layer comprises an aluminium magnesium spinel.

62. A sealing arrangement in accordance with claim 53, wherein the average layer thickness of the insulating layer amounts to from approximately 50 µm to approximately 200 µm.

63. The method of claim 62 wherein the average layer thickness is from approximately 100 µm up to approximately 140 µm.

64. A sealing arrangement in accordance with claim 42, wherein the sealing arrangement comprises a metallic solder layer in addition to the non conductive boundary layer.

65. A sealing arrangement in accordance with claim 64, wherein the solder layer contains a thermally sprayed solder material.

66. A sealing arrangement in accordance with claim 64, wherein the solder layer contains a silver based solder with an additive of elementary copper.

67. A sealing arrangement in accordance with claim 64, wherein the solder layer contains a silver based solder without an additive of elementary copper.

68. A sealing arrangement in accordance with claim 67, wherein the silver based solder contains an additive of copper oxide.

69. A sealing arrangement in accordance with claim 64, wherein the solder layer contains a silver based solder with a titanium additive.

70. A sealing arrangement in accordance with claim 42, wherein the sealing arrangement is formed as a coating on a preferably metallic component of a fuel cell unit of the fuel cell stack.

71. A sealing arrangement in accordance with claim 42, wherein the sealing arrangement is soldered to a preferably metallic component of a fuel cell unit of the fuel cell stack.

72. A sealing arrangement in accordance with claim 42, wherein the non conductive metal compound comprises a non conductive metal oxide.

73. A sealing arrangement in accordance with claim 42, wherein the non conductive boundary layer comprises a metal oxide formed during a soldering process in an oxygen-containing atmosphere.

74. A fuel cell stack comprising a plurality of fuel cell units which succeed one another along a stack direction, and at least one sealing arrangement in accordance with claim 42.

* * * * *